| [72] | Inventor | Robert E. Levin |
| | | Hamilton, Mass. |
| [21] | Appl. No. | 831,332 |
| [22] | Filed | June 9, 1969 |
| [45] | Patented | Aug. 10, 1971 |
| [73] | Assignee | Sylvania Electric Products Inc. |

[54] LENS HAVING ONE SPHERIC AND ONE ASPHERIC SURFACE
2 Claims, 7 Drawing Figs.

[52] U.S. Cl. .................................................. 350/189, 240/41.3, 350/200
[51] Int. Cl. .................................................. G02b 13/18
[50] Field of Search .......................................... 240/41.3; 350/189

[56] References Cited
UNITED STATES PATENTS

| 1,422,307 | 7/1922 | Salto | 350/189 UX |
| 2,282,167 | 5/1942 | Cullman | 350/189 X |
| 3,345,510 | 10/1967 | Bone | 240/41.3 |

*Primary Examiner*—John K. Corbin
*Attorneys*—Norman J. O'Malley and Laurence Burns ABSTRACT: An automobile headlight lamp having an elliptical reflector, a light source at one focus of the ellipse and an aperture at the other, with a lens in front of the aperture, the lens having one focus at the focus of the ellipse. The lens has one spheric and one aspheric surface, the latter conforming to a stated mathematical equation in order to reduce aberrations, including the chromatic.

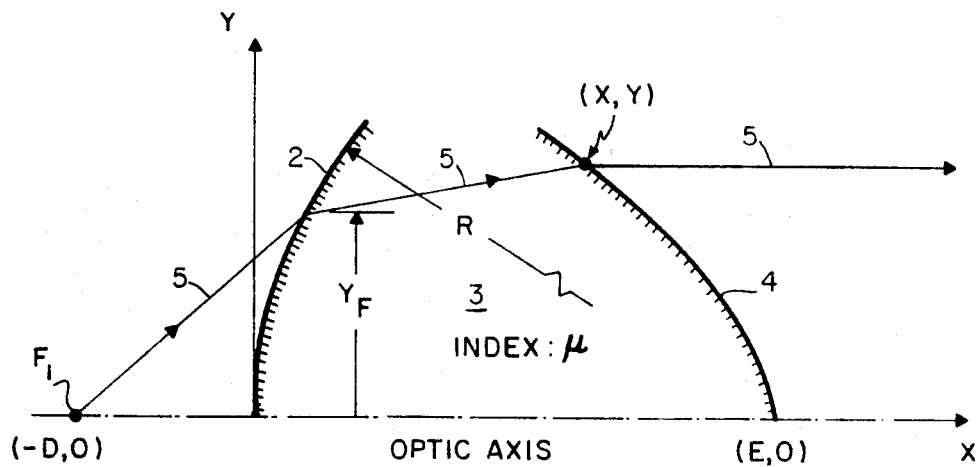
FIG.1
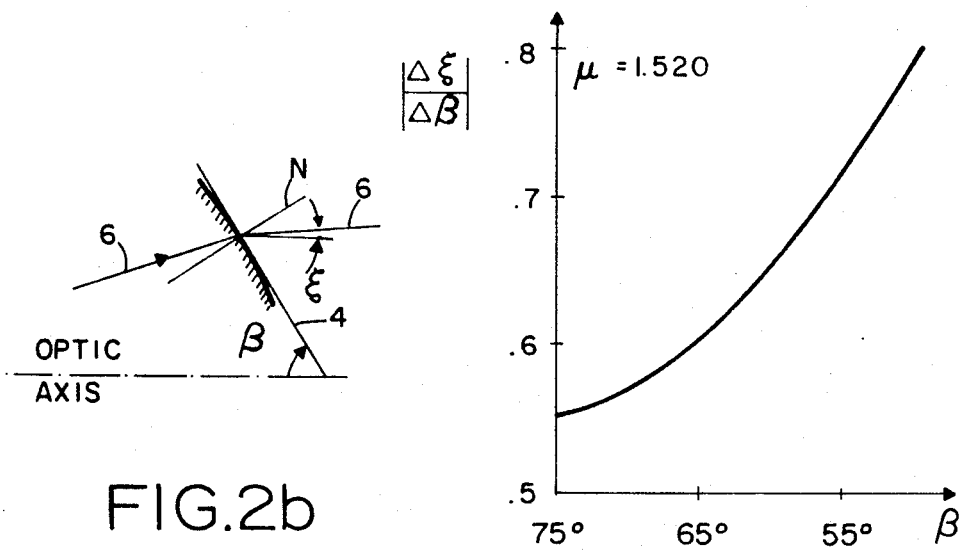
FIG.2b
FIG.2a

LENS HAVING ONE SPHERIC AND ONE ASPHERIC SURFACE

This application is based on application Ser. No. 694,526, filed Dec. 29, 1967, now abandoned, for Automobile Headlights in my name.

FIELD OF INVENTION

This invention relates to automobile headlights and especially to those having optical systems including an ellipsoidal reflector with a light source near one focus, an aperture near the other to limit the image, and a lens having one focus near the aperture, and the conjugate stigmatic point at infinity. The invention relates in particular to a lens for use in said system and embodying corrections for aberrations and the like much more extensive than those normally used.

BRIEF DESCRIPTION OF PRIOR ART

There are many methods of projecting controlled light patterns. When very clearly delineated edges are required an aperture may be projected to a great distance by a lens. It is often advantageous to use a single-lens element for economy and mechanical simplicity. However, a fast lens is required when the system is to be physically compact. Single-element, fast, spherical lenses have excessive aberrations. Thus many lenses have been used that are "aspheric." Conventionally, the aspheric surface is pressed or molded since only spheric surfaces are easy to grind. For simplicity the aspheric surfaces are normally conic in section. Even these aspheric lenses often have excessive aberrations since a correction is made for only one aberration (usually spheric) for a single-lens zone and a single object point. The chromatic aberration is commonly the limiting factor to applications of such lenses. This is especially true in automobile headlight systems of the type described, where such aberrations are especially harmful.

SUMMARY OF INVENTION

I have discovered that chromatic and other aberrations can be greatly reduced and the elliptical system described made practical for use in automobile headlights and the like by the use of a lens with a surface conforming to an equation that I have devised, and which is set forth later in the application, where it can be explained with reference to the drawings.

The lens of the invention is aspheric and embodies corrections far more extensive than those normally used. The lens is stigmatic; the rear focal point and plus infinity are the conjugate stigmatic points.

Lenses are usually pressed or molded in manufacture, and shrinkage occurs during cooling. Because of this it is only practical to maintain one surface to a high degree of precision by the pressing or molding itself, and to grind the other surface to the desired precision afterward. This means that the lens can have one spheric surface and one aspheric. In my invention, the aspheric surface is not a conic or other simple well-known curve, but a more complex curve as given by the previously mentioned equation.

BRIEF DESCRIPTION OF THE DRAWINGS

Other features, objects and advantages of the invention will be apparent from the following specification, taken in connection with the accompanying drawings, in which:

FIG. 1 illustrates a meridian plane section of a lens according to the invention.

FIG. 2($a$) is a graph showing the control error as a function of the aspheric surface slope error, and FIG. 2($b$) is a schematic drawing showing the relationship of these errors on the lens surface.

DESCRIPTION OF SPECIFIC EMBODIMENTS

Figure 4:
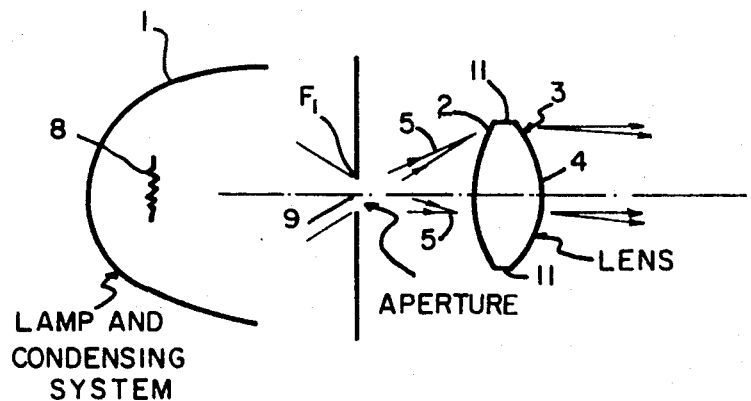
FIG. 4 is a general schematic view of an optical system using a lens according to the invention.

In FIG. 1, the rear focal point $F_1$ of the lens, which will be set at approximately the front focal point of the elliptical reflector 1 in FIG. 4, is shown as having a ray 5 from $F_1$ pass through the spheric surface 2 of the lens 3, through the material of the lens, which will usually be glass, and emerging at the aspheric surface 4. The coordinates of the various relevant points are shown in the usual manner, particularly those of the lens surface ($x$, $y$) as referred to orthogonal axes X and Y. The index of refraction of the lens material is given as $\mu$, and the radius of the spheric surface as R. The usual optic axis is taken as X.

In FIG. 2($b$) the angle $\beta$ of the slope of the aspheric curve 4 of the lens with respect to the X-axis is shown, with the normal N to the curve, a light ray 6 before and after passing through the surface 4, and the angle of error $\epsilon$. In FIG. 2($a$), a plot of the magnitude of the change $\Delta\epsilon$ per change $\Delta\beta$ is shown against $\beta$ for a $\mu$ of 1.520.

Figure 3B:
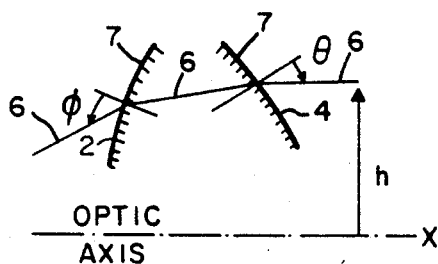
FIG. 3($a$) is a graph showing the lateral chromatic aberration as a function of the distance from the center of the lens, and FIG. 3($b$) is a schematic drawing showing the relationship of these errors to the lens.
Figure 3A:
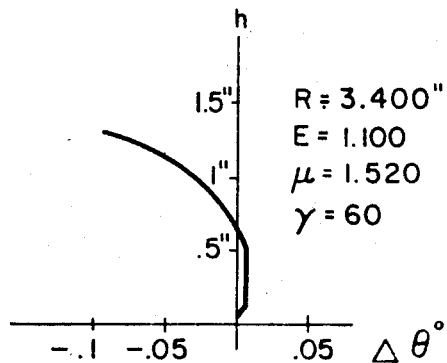

In FIG. 3($b$), the angle of incidence $\Phi$ of a ray 6 is shown for a schematically drawn lens 7, and the angle of the ray $\theta$ emerging from the aspheric surface 4. The height $h$ is shown above the optic axis X. FIG. 3($a$) shows the deviation $\Delta\theta$ from the desired value plotted against height $h$.

The lamp and condensing system are shown in FIG. 4, the ellipsoidal reflector 1, the light source 8 at the first focus thereof and the aperture 9 at the second or front focus $F_1$ of the reflector, $F_1$ being the rear focus of the lens 3 which has the spheric surface 2 and the aspheric surface 4 as in FIG. 1. The two surfaces are connected by the flat edges 11, which form a cylindrical surface around the lens transversely.

Figure 5:
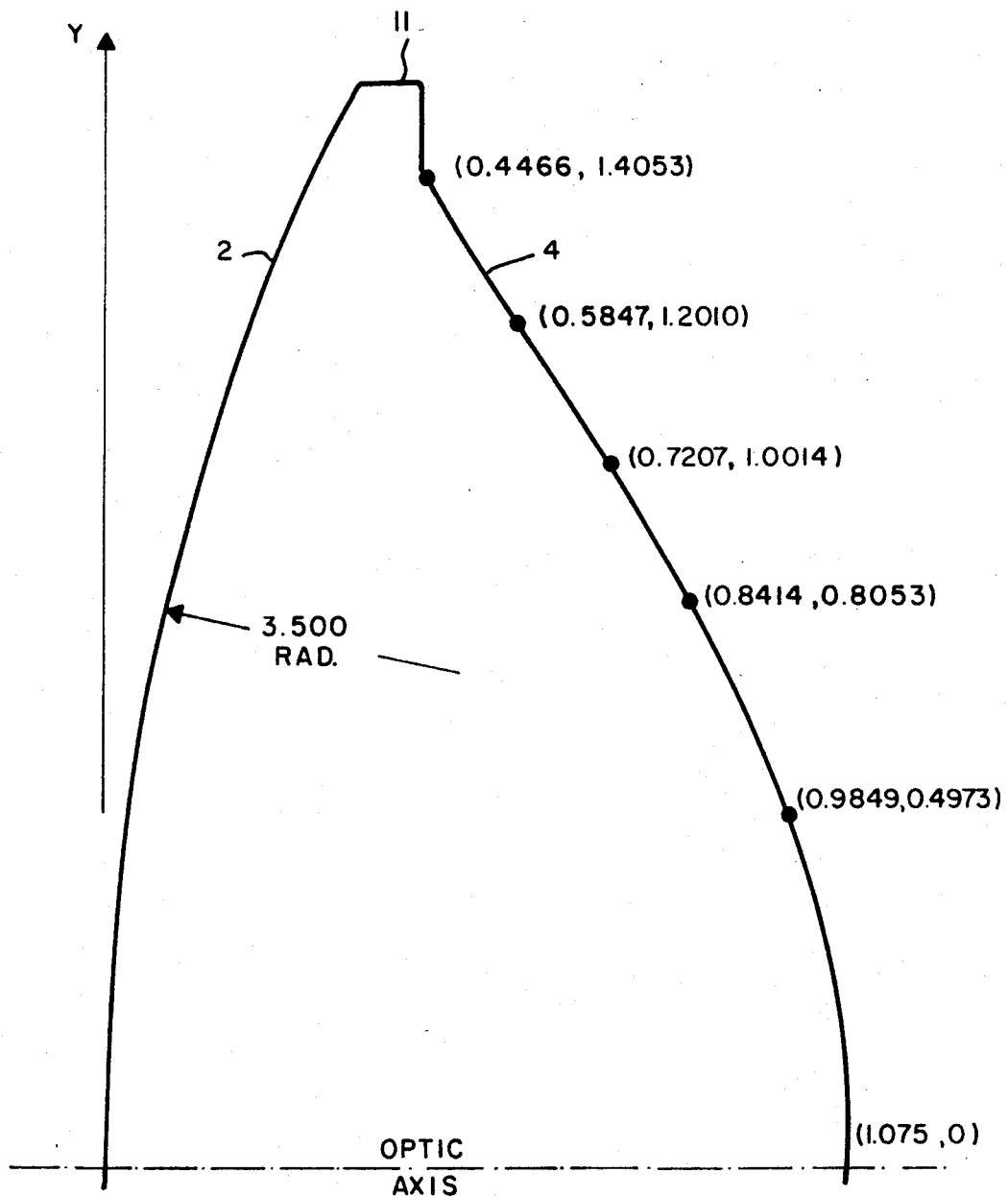
FIG. 5 is a cross-sectional view of half of a lens according to the invention, the lower half being symmetrical with the other.

FIG. 5 is a view of a specific lens according to the invention, for use in the system of FIG. 4, the ($x$, $y$) coordinates being given in inches for this example.

The aspheric surface 4 conforms to the following equation:

$$Y = \int_X^E \frac{\sqrt{1+(1-\mu^2)\tan^2\sigma}}{\mu \tan \sigma} dx$$

where $\sigma(x, y)$ is defined as $$\sigma = \arctan\left[\frac{\tan\psi}{\mu\sqrt{1+\tan^2\psi}-1}\right]; \quad 0 \leq \sigma \leq \frac{\pi}{2}$$

and where $\psi$ is given in parametric form (with $\alpha$ as a dummy variable), as $$\tan\psi = \frac{\frac{\mu^{-1}(D+R)}{R}\sqrt{\frac{2R\alpha-\alpha^2}{D^2+2\alpha(D+R)}}-\frac{\sqrt{2R\alpha-\alpha^2}}{R-\alpha}\sqrt{1-\frac{\mu^{-2}(D+R)^2}{R^2}\frac{2R\alpha-\alpha^2}{D^2+2\alpha(D+R)}}}{\sqrt{1-\frac{\mu^{-2}(D+R)^2}{R^2}\frac{2R\alpha-\alpha^2}{D^2+2\alpha(D+R)}}+\frac{\sqrt{2R\alpha-\alpha^2}}{R-\alpha}\frac{\mu^{-1}(D+R)}{R}\sqrt{\frac{2R\alpha-\alpha^2}{D^2+2\alpha(D+R)}}}$$

$$Y = \sqrt{2R\alpha-\alpha^2}+(X-\alpha)\tan\psi$$

and where $\mu$ is the index of refraction of the lens material, R is the radius of the spherical surface, D is the distance from the rear focal point to the spherical surface, Y is the distance from the optical axis to a point on the aspheric curve, X is the distance along the optical axis to the same point on the aspheric curve and E is the thickness of the lens along the optical axis. The parametric variable $\sigma$ may be considered as the angle of ray 5 within lens 3 from the normal to aspheric surface 4 (FIG. 1), although it functions as a dummy variable by canceling out in the final result.

An additional degree of freedom still exists. Even under the preceding constraints, the lens may be bent. This permits partial control of lateral chromatic aberration. Also, the accuracy of the press surface is known to be less than that of a ground surface; this will be particularly true if flame polishing is utilized to improve the microscopic surface quality. The bending may be utilized to limit the sensitivity of lens performance to errors in the aspheric surface. FIG. 2 shows the control error as a function of slope error on the aspheric surface.

A measure of the lateral chromatic aberration is given by:

$$\Delta\theta = \frac{180(\mu-1)}{\mu\pi\gamma_d}\left[\tan\theta - \frac{\sqrt{\mu^2-\sin^2\theta}}{\sqrt{\mu^2-\sin^2\phi}}\sin\phi\right]$$

FIG. 3 illustrates one specific evaluation of this function.

When the projected pattern of the system has been determined, the degree of lens bending can be determined from the desired edge definition of the beam. FIG. 4 shows one specific optical system. FIG. 5 shows the lens designed to project the beam whose total width is 2°. The equations for the aspheric surface were evaluated by iterative techniques, and the surface was specified by coordinate points in the meridian plane. A few typical points are given in FIG. 5.

The expression "dummy variable" used above is common in mathematical usage for a parametric variable which cancels out in the final result.

The expression $\Delta\theta$ referred to earlier in the application, is the approximate angular separation of the so-called F and C spectral lines, and $\gamma$ is Abbe's Number.

While we have described a specific embodiment of the invention, other embodiments and modifications will be apparent from the foregoing description to a person skilled in the art, without departing from the spirit and scope of the invention as defined in the claims.

What I claim is:

1. A lens for projecting a beam of light from a real object substantially at one conjugate stigmatic point, the other stigmatic point being at infinity, said real object being at substantially the second focus of an ellipsoid having a light source substantially at its first focus, said lens having one spheric and one aspheric surface at opposite sides, the aspheric surface conforming to the equation $$Y = \int_X^E \frac{\sqrt{1+(1-\mu^2)\tan^2\sigma}}{\mu\tan\sigma}dX$$

where $$\sigma = \arctan\left[\frac{\tan\psi}{\mu\sqrt{1+\tan^2\psi}-1}\right]; \quad 0 \leq \sigma \leq \frac{\pi}{2}$$

and where $\psi$ is given in parametric form as $$\tan\psi = \frac{\frac{\mu^{-1}(D+R)}{R}\sqrt{\frac{2R\alpha-\alpha^2}{D^2+2\alpha(D+R)}} - \frac{\sqrt{2R\alpha-\alpha^2}}{R-\alpha}\sqrt{1-\frac{\mu^{-2}(D+R)^2}{R^2}\frac{2\overline{R}\alpha-\alpha^2}{D^2+2\alpha(D+\overline{R})}}}{\sqrt{1-\frac{\mu^{-2}(D+R)^2}{R^2}\frac{2R\alpha-\alpha^2}{D^2+2\alpha(D+R)}} + \frac{\sqrt{2R\alpha-\alpha^2}}{R-\alpha}\frac{\mu^{-1}(D+R)}{R}\sqrt{\frac{2R\alpha-\alpha^2}{D^2+2\alpha(D+\overline{R})}}}$$

$$Y = \sqrt{2R\alpha-\alpha^2} + (X-\alpha)\tan\psi$$

and where $X$ is measured along the optical axis and $Y$ is measured normal to said axis, with the origin of coordinates being taken on said axis at the apex of the spheric surface, $E$ is the thickness of the lens along said axis, $\mu$ is the index of refraction for the material of the lens, $R$ is the radius of the spheric surface, $D$ is the distance on said axis from the second focus of said ellipsoid to the apex of the spheric surface, and $\sigma$ and $\alpha$ function as dummy variables.

2. The lens of claim 3, in which the material of the lens is glass.

UNITED STATES PATENT OFFICE
CERTIFICATE OF CORRECTION

Patent No. 3,598,477    Dated August 10, 1971

Inventor(s) ROBERT E. LEVIN

It is certified that error appears in the above-identified patent and that said Letters Patent are hereby corrected as shown below:

Column 3, line 31, change "$\gamma$" to --$\gamma_d$--. Column 4, line 16, that portion of the formula reading "$\mu \sqrt{1 + \tan^2 \psi - 1}$" should read -- $\mu \sqrt{1 + \tan^2 \psi} - 1$ --; line 34, change "claim 3" to --claim 1--.

Signed and sealed this 11th day of January 1972.

(SEAL)
Attest:

EDWARD M. FLETCHER, JR.
Attesting Officer

ROBERT GOTTSCHALK
Acting Commissioner of Patents